Patented Apr. 16, 1946

2,398,388

UNITED STATES PATENT OFFICE 2,398,388

PRODUCTION OF LAMINATED STOCK BONDED WITH A DIHYDROXY BENZENE ALDEHYDE RESIN

Arthur J. Norton, Wells, Maine, assignor to Pennsylvania Coal Products Company, Petrolia, Pa., a corporation of Pennsylvania No Drawing. Application April 5, 1941,
Serial No. 387,108

14 Claims. (Cl. 154—140)

The present invention relates to the production of a laminated stock made by treating or impregnating inorganic or organic base materials with a dihydroxy benzene aldehyde resin, said resin being capable of conversion into an insoluble and hard state by heat treatment.

In a more specific aspect of the present invention, the laminated stock is treated, coated or impregnated with a resorcin aldehyde resin which is capable of being converted into an insoluble and hard state by heat treatment.

It is desired to point out that it is the characteristic of all of these resins which may be produced by any of the methods hereinafter set forth that they are converted from a soluble, fusible state to an insoluble hardened state by heat treatment at unusually low temperatures. In accordance with the present invention, the impregnated stock may be hardened under standard pressures and heat treated at a temperature of 100° C. Further, the time required for cure is materially shortened as compared to the time required to cure an identical stock which has been impregnated with a prior art phenol formaldehyde condensation product. The time of cure is appreciably shortened, and may be as much as 20 to 25% less than that usually required using the prior art phenol formaldehyde condensation products.

Not only are the above advantages inherent in the present invention, but the laminated stock itself is characterized by a water resistance better than that of laminated stocks produced using the prior art phenol condensation products. Moreover, the laminated product has a tensile, transverse, shearing and impact strength which is materially higher than the laminated stock produced using the prior art phenol condensation products. This increased strength is due at least partially to the fact that the impregnated laminae are subjected to a lower temperature in order to convert the laminae into a laminated heat treated cured mass, and the lower temperature produces less strength deterioration in the laminae.

The material or stocks produced according to the present invention take on a fine lustre, and are readily machinable, and are admirably adapted for the fabrication of gears, bearings and blocks or structures having a thickness varying from one inch to twelve inches or greater, such as used for bearings for propeller shafts and roller mills. It is desired to point out that the speed of cure of the resins herein disclosed is faster than the speed of cure of the prior art phenol aldehyde condensation products, and this is partially responsible for the short time required for curing thick blocks or structures impregnated with the resins of the present invention. Moreover, as stated, the resins of the present invention cure at a low temperature of 100° C., and therefore it takes less time to completely cure a thick block or structure using these resins.

Attempts have been made to produce dihydroxy benzene aldehyde resins, and more specifically resorcin formaldehyde resins but, as far as is known, from a practical standpoint it has not been possible to produce these resins in quantity, this being principally due to the fact that the prior art methods used for the production of the dihydroxy benzene aldehyde resins were vitally defective from the standpoint of controlling the reaction between the dihydroxy benzene as, for example resorcin, and the aldehyde as, for example, formaldehyde.

The present invention will be illustrated by several examples:

EXAMPLE I 17 sheets of selected paper stock were dipped in an alcohol solution of a heat convertible resin produced by reacting resorcin with formaldehyde in the presence of a mild acid catalyst, the production of said resin being hereinafter set forth in detail, and the product produced therefrom being designated resin A. All the solvent was removed from each of the sheets of paper by air drying or by low temperature treating in an oven. The top and bottom sheets of the laminated block were dipped twice and were dried after each dipping until free of solvent in order that the bottom and upper surface of the block would be characterized by more lustrous surfaces. These treated, coated, or impregnated sheets of paper were piled one on another and placed in a semi-heated press between polished plates and pressed for ten minutes at a pressure of 1500 pounds per square inch, the temperature of the press platens being maintained at 212° F. during the compression period. Very large blocks or compressed sheets of material may be chilled before removing the piece from the press. Instead of curing the impregnated block in a press, the impregnated laminated sheets may be inserted into a mold and compressed and cured at a suitable temperature of 212° F., the article being molded to the desired shape. Any suitable pressure may be employed. The resultant laminated stock was hard, completely cured and highly water resistant.

Example II 18 pieces of unbleached, unsized cotton cloth were dipped in a solution of potentially reactive resorcin formaldehyde resin in an acetone solution, said resin being prepared in accordance with the hereinafter described method, resulting in the production of resin A. The so impregnated sheets were each separately dried until the solvent was substantially removed and then assembled and introduced into a press where they were cured at a temperature of 212° F. for ten minutes and under a pressure of 1500 pounds per square inch. The resultant laminated stock was completely cured, as shown by a test for solvent resistance, and further withstood the test of boiling water without delamination or surface deterioration. The 18 pieces of unbleached, unsized cotton cloth treated as above produced a panel which was about ⅛ inch thick, and was characterized by a high lustre, good toughness, and fair flexibility, considering the thickness of the finished laminated sheet.

Various kinds of base materials may be used, such as cotton cloths, canvas, various kinds of cloth, various kinds of paper, asbestos, sheets of wood pulp, and alpha cellulose pulp. It is desired to point out that the laminae may be of vegetable or mineral origin. Included under the term vegetable are the fibrous cellulosic materials such as cotton cloth, paper and the like, and included under the term mineral are materials coming within the term "asbestos" which is a generic term to describe compounds of mineral origin. It is further desired to point out that since the laminated stock of the present invention is cured at an extremely low temperature, namely about 100° C., materials which would be damaged or decomposed by the prior art temperatures of curing of around 135° to 150° C. may be used as the base material in the present invention. More specifically, woolen materials in some instances may be coated or impregnated with a solution of the resin produced in accordance with the present invention, said resin being adapted to be hardened upon heating to 100° C.

It is desired to point out that the present invention opens an entirely new field for the impregnation of materials with dihydroxy benzene aldehyde resins adapted to be cured at a low temperature of 100° C. In other words, a great many materials which deteriorated under temperatures of 135° to 150° C. which was the curing temperatures of the prior art resins, may now be impregnated with the resins of the present invention which, as hereinafter pointed out, may have their curing temperatures controlled so as to vary between 100 and 135° C. This control may be brought about by combining any of the resins hereinafter produced and typified resin A, B and C, with such a proportion of a different phenolic resin which will bring the temperature of curing of the composite resins between 100 and 135° C. For example, to resin A, there may be added a small proportion (say 10%) of a known heat reactive phenolic condensation product, and the temperature of curing of the composite resin material will be about 105° C. If 20% of the resin is added to a resorcin aldehyde resin herein designated resin A, the sheet may be cured at 110° C. The above resins are separately produced and then mixed, and this is the preferred method of proceeding so as to produce a composite resin. Alternatively, a phenol material may be mixed with a dihydroxy benzene and the mixture of the dihydroxy benzene and phenol material reacted with formaldehyde in accordance with any of the procedures hereinafter set forth, but this procedure will not give as desirable an end product as if the two resins were separately made and then combined to produce a composite homogeneous resin.

Production of resin A

Resorcin and formaldehye in the presence of a buffer catalyst may be reacted to produce a resin herein designated resin A. More specifically, 90 grams of resorcin may be reacted with 165 grams of 37% formaldehyde solution in the presence of an exceedingly small amount of a buffer catalyst typified by monosodium phosphate, which is a mildly acid catalyst. Two parts of this catalyst is added to the above mixture. There is sufficient water present in the formaldehyde so that the resorcin and monosodium phosphate will dissolve in the formaldehyde solution. However, if necessary, additional water may be added. The above mixture was heated to 40° C. and held there for about three hours. Thereafter, the temperature of the reaction mass was raised gradually to 60° C. at which point the formaldehyde was substantially all combined with the resorcin. This temperature was held for a period of one hour, but it is obvious that this is merely illustrative and may be varied in view of the character of the reaction ingredients, and the volume of the reacting mass. Preferably, the reaction mass was distilled in a vacuum to remove the water of condensation. This vacuum treatment was carried out until the mass was substantially completely dehydrated and assumed a viscous condition. In order to adapt this reaction product to the production of a laminated structure, as herein set forth, the mass was dissolved in alcohol. Instead of using monosodium phosphate, there may be used a mild acid catalyst of a buffer type having a pH between 5 and 7, such as the mixed boric acid—borax combinations; potassium acid phthalate—sodium hydroxide mixtures; phenyl acetic acid and sodium phenylacetate; potassium acid phthalate and dipotassium phthalate, or extremely dilute solutions of such acids as formic acid, oxalic acid, citric acid, or the like, said dilution being sufficient to lower the pH of the reaction mass to a range varying between 5 to 7.

It has been discovered when the pH of the reaction solution is controlled between 5 and 7 that the reaction between the dihydroxy benzene as, for example, resorcin and the aldehyde as, for example, formaldehyde proceeds at such a slow rate as to prevent the setting up of the reaction mixture, or, stated differently, with this pH range the reaction mass does not begin to set and the final reaction product is then capable of being converted into a hard and fusible mass by heating to 100° C.

It is desired to point out that in a resin of the character above set forth the molecular ratio of the formaldehyde to the resorcin in the reaction mass is greater than $\frac{1}{10}$ to 1. Under such conditions, the reaction mass is potentially reactive. If the ratio of formaldehyde to the resorcin is less than $\frac{1}{10}$ to 1, then the resulting reaction mass is not capable of being heat hardened without the addition of a supplemental amount of formaldehyde or other hardening agent.

Instead of carrying out the reaction in the presence of a limited amount of water, a very substantial amount of water equal in weight to the amount of resorcin may be used in order to dilute the resorcin and to further slow down the reaction between the resorcin and formaldehyde and assist in preventing the reaction from producing the set-up product. Instead of water, any other medium may be used which does not form reaction products with the resorcin formaldehyde or with the catalyst used. The diluting medium is preferably water, because it is a mutual solvent for the reacting ingredients.

Instead of cutting the reaction product with alcohol, if it has not been carried to a point where it is no longer soluble in water, the viscous mass may be dissolved in water and the aqueous solution of the resin used for the impregnation or coating of the laminae adapted to be compressed and heat treated to produce a final hardened composite laminated structure.

*Production of resin B*

A resin may be produced by reacting a dihydroxy benzene and an aldehyde in the presence of a mildly alkaline catalyst. For example, to 75 grams of resorcin there may be added 60 grams of 37% formaldehyde and 5.4 grams of azoxy-o-toluidine. In order to prevent the reaction from proceeding too vigorously, it is highly essential that the formaldehyde be carefully neutralized with a neutralizing agent. While common neutralizing agents may be used, it is preferred to use sodium carbonate. The azoxy-o-toluidine as well as pyridine and urea are mild alkaline catalysts of a buffering nature. In other words, these catalysts not only act as a catalyst but perform the additional function of taking up small amounts of acid which may be formed from the oxidation of the formaldehyde during the course of the reaction.

The reaction mixture is heated slowly to 60° C. and then held there for thirty minutes. Thereafter, the temperature is raised to 70° C. and held at this temperature until the formaldehyde is substantially all combined with the resorcin. Then the temperature is allowed to drop slowly to 55° C., at which temperature the mass assumes a viscous condition. This mass may be cut with an equal volume of acetone and used for coating or impregnating purposes in accordance with the method hereinbefore described.

It is desired to point out that the ratio of the formaldehyde to the resorcin may vary from $\frac{8}{10}$ to 1.2 mols of formaldehyde to one mol of resorcin.

In general it may be stated that the mildly alkaline catalyst such as azoxy-o-toluidine, pyridine and urea may be present in percentages ranging from 1 to 10% based on the amount of resorcin used. In other words, for 100 grams of resorcin in the reaction mixture there should be present 1 to 10% of the catalyst.

*Production of resin C*

The following resin is produced by reacting a dihydroxy benzene as, for example, resorcin and an aldehyde as, for example, formaldehyde in the presence of a neutral or acid catalyst, and this is then further mixed with a hardening agent such as hexamethylene tetramine to convert the initial reacting product into a potentially heat reactive product which may be dissolved in a suitable solvent as, for example, a spirit solvent such as alcohol, and used for the production of a laminated stock in accordance with the present invention.

In preparing the resin, 400 grams of resorcin are well mixed with 400 grams of water, the latter serving as the diluting medium, and there is added to the mixture about 8 grams of an acid converting agent or catalyst such as oxalic acid. This mixture is heated in a closed container which has a reflux condenser. This mixture is heated for a suitable length of time to a temperature which will insure substantially instantaneous reaction of an added aldehyde. Since the diluting medium is water, the mixture is heated to about 100° C., which is the boiling point of water. After the mixture has been brought up to the boiling point, about 200 grams of 37% formaldehyde are carefully added, the latter being introduced into the resorcin containing mixture so that as the formaldehyde solution is added, it is substantially completely reacted with resorcin. Any method may be employed which insures this object being attained. One method of attaining this object is to add the formaldehyde solution drop by drop or in the form of a spray, or in the form of thin streams, care being taken that there is no substantial excess of aldehyde present at any time. If more aldehyde is present than can react at any given time with the resorcin, said excess of aldehyde favors a violent reaction which not only may become uncontrollable, but if it does not become uncontrollable, results in the production of undesirable by-products.

During the time the formaldehyde solution is being added, the mixture is constantly stirred and the reaction mass is kept at about the boiling point, the reaction mass usually producing enough heat to maintain the mixture at the boiling point. It may be stated that it usually takes from about 15 to 20 minutes to add the formaldehyde solution to the resorcin solution, such time being sufficient for all the resorcin to be reacted with the formaldehyde. However, this time may be considerably varied and still come within the spirit of the invention. After the addition of the formaldehyde solution has ceased, the mixture is refluxed for a suitable period of time in order to insure complete combination of the formaldehyde with the resorcin, and an adjustment of the reaction products to their final end point. It is probable that during this additional heating period, there is some further condensation and/or polymerization. The supplemental heating period does insure a uniform end product. At the end of this period, the reaction mass is a clear homogeneous viscous liquid, having a consistency of about light colored molasses. In order to remove the water of condensation, the liquid is evaporated under a vacuum for a suitable length of time, as for example 55 minutes, at a temperature of 85° C. After the water of condensation has been removed, the temperature starts to rise due to the fact that the mixture no longer is subjected to the cooling effect of the boiling water. The temperature, therefore, is raised somewhat, usually to about 116° C. This procedure insures that any uncombined resorcin will be removed from the reaction product. At this stage, the reaction mass is still a hot viscous liquid. Upon cooling, the mass solidifies to a clear amber-like resinous product which is brittle and grindable. At this stage, the cooled product is thermoplastic and will not set on heating to 150° C. It is desired to point out that the melting point of the cooled finished resin can be varied by the amount of formaldehyde used in the initial reaction, and that even when $\frac{8}{10}$ of a mol of formaldehyde is used for each mol of resorcin, the final end product when run according to the above directions is thermoplastic and exhibits no tendency to set with heat until additional methylene groups have been added. In the examples set forth, one mol of resorcin is reacted with about ½ mol of formaldehyde.

In order to form a heat reactive product from the above intermediate, the brittle amber-like mass is treated with a potential hardening agent. Preferably the brittle intermediate product is ground to about 100 mesh or thereabouts, and then to 100 parts of the intermediate resin there is added 10 parts of dry powdered hexamethylene tetramine. This mixture when subjected to heat treatment at temperatures ranging from 100° C. to 150° C., is converted into a hard infusible insoluble mass. As stated, the mixture may be used by dissolving it in a suitable volatile solvent, as for example alcohol, acetone, or any spirit solvent. The mixture of the resorcin formaldehyde composition and hexamethylene tetramine in solution is characterized by the property of being stable under normal conditions for periods varying between three to four weeks. This is in contradistinction to the prior art resorcin formaldehyde solutions to which a hardening agent such as hexamethylene tetramine has been added. One of the difficulties of using the resorcin aldehyde reaction products to which a hardening agent has been added is that such products when they are dissolved in a solvent, tended to set up; that is, there was a decided tendency for at least a part of the resorcin aldehyde mixture to react in solution with the hardening agent prior to the time the solution was heat treated. In other words, the prior art resorcin formaldehyde compositions to which a hardening agent such as hexamethylene tetramine have been added, upon being brought into solution, tended to gel, thereby indicating a premature reaction which greatly reduced the effectiveness of the solution when used for various purposes such as impregnation and the like. It is thought that one of the reasons why the disclosed reaction product between a dihydroxy benzene and an aldehyde does not prematurely set up when treated with hexamethylene tetramine or the like is that the reaction product of the dihydroxy benzene and the aldehyde is formed under controlled conditions of the character above set forth. In other words, the amber-like brittle reaction product of the dihydroxy benzene typified by resorcin and an aldehyde typified by formaldehyde, is a substantially uniform product and is devoid of premature setting up or hardening properties. The setting up does not begin during the time the solution is used, but only upon the application of heat at a temperature of about 100° C. or slightly higher.

The resin produced as set forth may be used for the production of laminated stock by dissolving the resin in a spirit solvent, said resin produced by reacting resorcin and formaldehyde in the presence of oxalic acid as herein disclosed, and to which 10 parts of a hardening agent such as hexamethylene tetramine has been added, being dissolved in a spirit solvent in the ratio of 100 parts of the resin to 200 parts of the spirit solvent, as for example alcohol.

Instead of using oxalic acid as the catalyst in the production of the above described product, boric acid may be substituted therefor, and the reaction carried out in substantially the same manner as when using oxalic acid, the same procedure being followed to insure the production of a uniform final product.

Instead of reacting resorcin under the conditions above set forth, there may be substituted for resorcin other dihydroxy benzenes such as catechol and hydroquinone.

The dihydroxy benzenes, including resorcin, utilized in carrying out the present invention may be the commercial grades, or said dihydroxy benzenes including resorcin may contain appreciable percentages of monohydric phenols, as for example phenol. The resorcin may also contain diresorcin.

While hexamethylene tetramine has been set forth as the most desirable hardening agent, it is desired to point out that the various oxymethylenes, paraform, or paraldehyde may be used, or any polymer or homologue of formaldehyde.

What I claim is:

1. The method of making a laminated stock comprising curing under pressure at a temperature varying from about 100° C. to about 110° C. a plurality of assembled fibrous laminae impregnated with the resinous reaction product of a mixture of a resorcin and formaldehyde in the presence of 1 to 10% of a mild alkaline catalyst having a buffering action, the molecular ratio of the aldehyde to the dihydroxy benzene varying between about .8 to 1.2 of the former to one of the latter, said resin being converted into an insoluble and hardened state at said curing temperature.

2. The method of making a laminated stock comprising curing under pressure at a temperature varying from about 100° C. to about 110° C. a plurality of assembled fibrous laminae impregnated with the resinous reaction product of a mixture of a dihydroxy benzene and aldehyde in the presence of a small amount of azoxy-o-toluidine functioning as an alkaline catalyst having a buffering action, the molecular ratio of the aldehyde to the dihydroxy benzene varying between about .8 to 1.2 of the former to one of the latter, said resin being converted into an insoluble and hardened state at said curing temperature.

3. The method of making a laminated stock comprising curing under pressure at a temperature varying from about 100° C. to about 110° C. a plurality of assembled fibrous laminae impregnated with the resinous reaction product of a mixture of a dihydroxy benzene and aldehyde in the presence of a small amount of pyridine functioning as an alkaline catalyst having a buffering action, the molecular ratio of the aldehyde to the dihydroxy benzene varying between about .8 to 1.2 of the former to one of the latter, said resin being converted into an insoluble and hardened state at said curing temperature.

4. The method of making a laminated stock comprising curing under pressure at a temperature varying from about 100° C. to about 110° C. a plurality of assembled fibrous laminae impregnated with the reaction product of a mixture of resorcin, a monohydric phenol, an aldehyde, and a small amount of a mildly alkaline catalyst, the molecular ratio of the aldehyde to the resorcin varying between about .8 to about 1.2 of the former to one of the latter, said resin being converted into an insoluble and hardened state at said curing temperature.

5. The method comprising making a laminated stock impregnated with a hardened resorcin aldehyde resin, said stock having better water resistance, and higher shearing and impact strengths than a similar stock impregnated with a hardened monohydric phenol aldehyde resin, by curing at a temperature varying from about 100° C. to about 110° C. a plurality of assembled fibrous laminae impregnated with the resinous reaction product of a mixture of resorcin and an aldehyde in the presence of a mild acid catalyst, the mixture having a pH varying between 5 and 7 whereby premature set-up of the reaction product is inhibited, said resin being converted into an insoluble and hardened state at said curing temperature.

6. The method of making a laminated stock impregnated with a hardened resorcin aldehyde resin, said stock having a better water resistance and higher shearing and impact strengths than a similar stock impregnated with a monohydric phenol aldehyde resin, by curing at a temperature varying from about 100° C. to about 110° C. a plurality of assembled fibrous laminae impregnated with a reaction product of a mixture of resorcin and a neutralized aldehyde in the presence of a small amount of a mild alkaline catalyst having a buffering action, said resin being converted into an insoluble and hardened state at said curing temperature.

7. The method of making a laminated fibrous stock comprising curing under pressure at a temperature varying from about 100° C. to about 110° C. a plurality of assembled fibrous laminae impregnated with the resinous reaction product of a mixture of a dihydroxy benzene and an aldehyde in the presence of 1 to 10% of a catalyst, said resin being converted into an insoluble and hardened state at said curing temperature.

8. The method of making a cured laminated stock comprising impregnating a plurality of impregnatable fibrous laminae with a phenolic resin material, the essential resin component of which is a resorcin aldehyde resin adapted to be converted by heat treatment to an insoluble and hardened state, assembling said laminae into a laminated stock, and curing said stock at a temperature varying from about 100° C. to about 110° C.

9. The method of making a cured laminated stock comprising impregnating a plurality of impregnatable fibrous laminae with a phenolic resin material, the essential resin component of which is a dihydroxy benzene aldehyde resin, the molecular ratio of the aldehyde to the dihydroxy benzene varying from .5 to 1 of the former to 1 of the latter, said resin material having in admixture therewith enough hardening agent to convert said resin on heat treatment into an insoluble and hardened state, assembling said laminae into a laminated stock, and curing said stock at a temperature of about 100° C.

10. The method of making a cured laminated stock comprising impregnating a plurality of impregnable fibrous laminae with a phenolic resin material, the essential predominating resin component of which is a dihydroxy benzene aldehyde resin, the resin material having present a monohydric phenolic aldehyde resin, said resin material being adapted to be converted by heat treatment into an insoluble and hardened state, assembling said laminae into a laminated stock, and curing said stock at a temperature varying between 100° and about 110° C.

11. The method of making a cured laminated stock comprising impregnating a plurality of impregnable laminae with a phenolic resin material, the essential predominating resin component of which is a dihydroxy benzene aldehyde resin, the resin material having present a monohydric phenolic aldehyde resin, said resin material being adapted to be converted by heat treatment into an insoluble and hardened state, assembling said laminae into a laminated stock, and curing said stock at a temperature varying from 100° to about 135° C.

12. The method of making a cured laminated stock comprising impregnating laminae with a phenolic resin material, the essential predominating resin component of which is a dihydroxy benzene aldehyde resin, the molecular ratio of the aldehyde to the dihydroxy benzene varying from .5 to 1 of the former to 1 of the latter, said resin material having present a monohydric phenolic aldehyde resin, said resin material having in admixture therewith enough hardening agent to convert said resin material on heat treatment into an insoluble heat hardened state, assembling said laminae into a laminated stock, and curing said stock at a temperature varying from about 100° to about 110° C.

13. The method of making a cured laminated stock comprising impregnating laminae with a phenolic resin material, the essential predominating resin component of which is a dihydroxy benzene aldehyde resin, the molecular ratio of the aldehyde to the dihydroxy benzene varying from .5 to 1 of the former to 1 of the latter, said resin material having present a monohydric phenolic aldehyde resin, said resin material having in admixture therewith enough hardening agent to convert said resin material on heat treatment into an insoluble heat hardened state, assembling said laminae into a laminated stock, and curing said stock at a temperature varying from about 100° to 135° C.

14. The method of producing a cured laminated stock comprising assembling laminae which are impregnated with a substantially solvent-free resin material, the essential resin component of which is a dihydroxy benzene aldehyde resin adapted to be converted by heat treatment to an insoluble and hardened state, and curing said assembled stock at a temperature varying from about 100° to 110° C.

ARTHUR J. NORTON.